Jan. 5, 1937.   G. HEYMER   2,066,728
PRINTING SOUND RECORD
Filed March 27, 1934
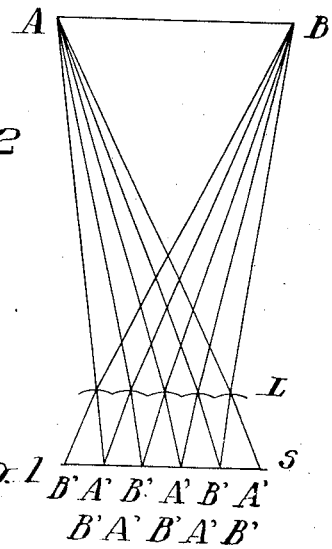
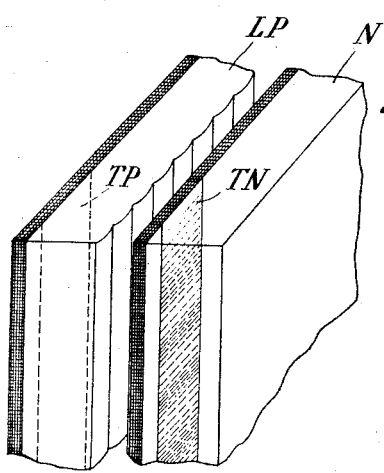
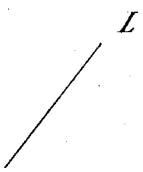
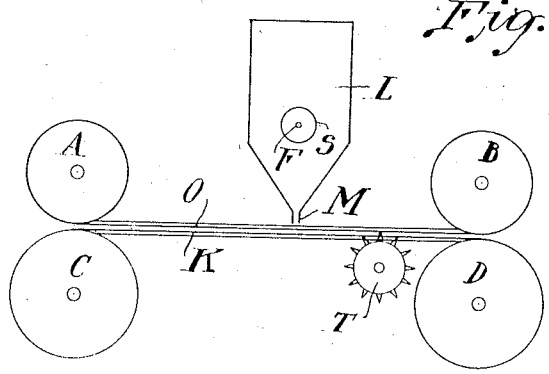
Inventor:—
Gerd Heymer,
by Potter, Pierce & Scheffler,
Attorneys.

Patented Jan. 5, 1937

2,066,728

UNITED STATES PATENT OFFICE 2,066,728

PRINTING SOUND RECORD

Gerd Heymer, Wolfen Kreis Bitterfeld, Germany, assignor to I. G. Farbenindustrie Aktiengesellschaft, Frankfort-on-the-Main, Germany Application March 27, 1934, Serial No. 717,671
In Germany March 29, 1933

4 Claims. (Cl. 95—75)

My present invention relates to printing sound records and more particularly to printing sound records on lenticular film.

One of its objects is an improved process for printing a sound record of the variable density type on lenticular film. Another object is an arrangement for printing according to my process. Further objects will be seen from the detailed specification following hereafter.

Reference is made to the accompanying drawing in which

Fig. 1 shows an arrangement for printing according to this invention,

Fig. 2 shows the trace of the rays from the source of light through the lenticulations of the film when printing according to this invention, and Fig. 3 shows diagrammatically an apparatus for printing according to this invention.

In printing a lenticular picture film it is necessary to expose the film through the embossed side thereof. If a sound track is to be printed on a lenticular film with the embossed side of the latter in contact with the negative, difficulties are encountered in that, due to the distance between the sound negative and the sensitized layer on the lenticular film the copy of the print produced on the printing film is not sharp. To overcome these difficulties it has been proposed to print the sound record separately from the picture record, by arranging the sensitized layer on the lenticular film in contact with the originally sensitized layer of the negative film.

According to this invention a sharp print of a sound track of the varying density type is produced on the lenticular printing film when printing through the embossed side, by using for the exposure a slot-shaped source of light which extends parallel to the steps of the sound track. In direction of the sound track the extension of the source of light is as small as possible. Preferably there is used a one-wire lamp which extends parallel to the steps of the sound track.

The source of light may be arranged at any distance from the negative film, but the breadth of the source of light is advantageously so chosen with respect to its position that the image of the source projected by one lenticular element of the printing filter has just the breadth of one lenticular element, so that under the lenticular elements, a uniform image of the source of light is obtained which is not interrupted by dark spots. While printing, the lenticular film is preferably arranged with its embossed side in contact with the originally sensitized layer of the negative film. The films may be spaced apart, however, up to several times the thickness of a film, but the quality of reproduction of the sounds decreases with increasing distance of the films from each other.

Thus a sound record may be printed optically on a lenticular film illuminated through the embossed side, and an unobjectionable reproduction of the sound track obtained, if a slot-shaped source of light is used.

In Fig. 1 of the accompanying drawing an arrangement of the films and the source of light according to the invention is represented by way of example:

The lenticular positive film LP is arranged so that its embossed side is in contact with the originally light-sensitive layer of the negative film N carrying the sound record TN, which is of the variable density type. The lenticular elements of the printing film extend perpendicularly to the steps of the sound track. For the exposure there is used the slot-shaped source of light L, which extends parallel with the steps of the sound track TN. TP represents the print of the sound track.

Fig. 2 shows the trace of the rays when printing according to this invention. AB is the line shaped source of light, for instance, a wire of an incandescent lamp. By each of the lenticular elements a real image of AB is printed in the light sensitive layer S. These images may be larger or narrower than the breadth of the lenticular elements. Fig. 2 shows the case in which the images A'B' of AB projected by two adjacent lenticular elements are just juxtaposed. This condition is realized when $$\frac{f}{d}=n\cdot\frac{F}{D}$$

$f$ being the thickness of the film, $d$ the breadth of the lenticular elements, $n$ the index of refraction, $F$ the distance of the source of light AB, and $D$ the breadth of the source of light AB.

Fig. 3 shows diagrammatically an apparatus for printing according to this invention. L is the lamp house in which there is arranged the linolite lamp S of which the incandescent wire is seen in section. The light slit M is parallel to the incandescent wire of the linolite lamp. The films are fed from the rolls A and C to the rolls B and D continuously by means of the sprocket drum T.

What I claim is:

1. A process of printing a sound record of the variable density type, provided on a smooth film, onto a lenticular film which comprises arranging a lenticular printing film so that its lenticular elements face the emulsion layer of said smooth sound film and extend perpendicularly to the steps of said sound record, projecting a slot-shaped source of light extending parallel with the steps of the sound record through said sound record onto said lenticular film, the breadth of the source of light and its distance from the films being such that the image of the source of light projected by each lenticulation of the printing film covers the breadth of said lenticular element, thus producing a uniform image which is not interrupted by dark spots.

2. An arrangement for printing a sound record of the variable density type, provided on a smooth film, onto a lenticular film which comprises in combination a smooth sound film bearing a sound record of the variable density type, a lenticular printing film with the lenticular elements facing the emulsion layer of said sound film and extending perpendicularly to the steps of said sound record, a slot-shaped source of light arranged parallel with the steps of said sound record on the side of the sound record thus illuminating said sound record with as little extension as possible in the direction of the sound record, the breadth of the source of light and its distance from the films being such that the image of the source of light projected by each lenticulation of the printing film covers the breadth of said lenticular element, thus producing a uniform image which is not interrupted by dark spots, and means for producing a sharp image of said illuminated part of said sound record in the emulsion layer of said lenticular film.

3. An arrangement for printing a sound record of the variable density type, provided on a smooth film, onto a lenticular film which comprises in combination a smooth sound film bearing a sound record of the variable density type, a lenticular printing film having its lenticular elements in contact with the emulsion layer of said sound film and extending perpendicularly to the steps of said sound record, and a slot-shaped source of light arranged on the side of the sound film extending parallel with the direction of the steps of said sound record, the breadth of the source of light and its distance from the films being such that the image of the source of light projected by each lenticulation of the printing film covers the breadth of said lenticular element, thus producing a uniform image which is not interrupted by dark spots.

4. An arrangement for printing a sound record of the variable density type, provided on a smooth film, onto a lenticular film which comprises in combination a smooth sound film bearing a sound record of the variable density type, a lenticular printing film with its lenticular elements facing the emulsion layer of said sound film and extending perpendicularly to the steps of said sound record, a slot-shaped source of light arranged on the side of the sound film and extending parallel with the steps of said sound record thus illuminating said sound film with as little extension as possible in the direction of the sound record, the breadth of the source of light and its distance from the films being such that the image of the source of light projected by each lenticulation of the printing film covers the breadth of said lenticular element, thus producing a uniform image which is not interrupted by dark spots; and an optical system between said lenticular film and said sound film for producing a sharp image of said illuminated part of said sound film in the emulsion layer of said lenticular film.

GERD HEYMER.